(12) United States Patent
Sakakibara

(10) Patent No.: US 6,433,517 B2
(45) Date of Patent: *Aug. 13, 2002

(54) BATTERY CHARGER AND CHARGING METHOD

(75) Inventor: Kazuyuki Sakakibara, Aichi-Ken (JP)

(73) Assignee: Makita Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/781,318

(22) Filed: Feb. 13, 2001

Related U.S. Application Data

(63) Continuation of application No. 09/531,596, filed on Mar. 20, 2000, now Pat. No. 6,204,641, which is a continuation of application No. 09/258,140, filed on Feb. 26, 1999, now Pat. No. 5,075,347.

(30) Foreign Application Priority Data

Feb. 28, 1998 (JP) .............................. 10-64736

(51) Int. Cl.$^7$ ................................................ H02J 7/04
(52) U.S. Cl. ..................................................... 320/153
(58) Field of Search ................................. 320/153, 150, 320/128, 137

(56) References Cited

U.S. PATENT DOCUMENTS

| | | | |
|---|---|---|---|
| 5,627,451 A | 5/1997 | Takeda | 320/151 |
| 5,642,031 A | 6/1997 | Brotto | 320/156 |
| 5,909,101 A | 6/1999 | Matsumoto | 320/116 |
| 5,912,546 A | 6/1999 | Sakou | 320/150 |
| 5,945,803 A | 8/1999 | Brotto | 320/150 |
| 6,008,628 A | 12/1999 | Brotto | 320/137 |
| 6,018,231 A | 1/2000 | Shaver | 320/116 |
| 6,204,640 B1 * | 3/2000 | Sakakibara | 320/150 |
| 6,204,641 B1 * | 3/2000 | Sakakibara | 320/153 |
| 6,225,786 B1 * | 3/2000 | Muramatsu et al. | 320/150 |
| 6,075,347 A * | 6/2000 | Sakakibara | 320/150 |
| 6,124,698 A * | 9/2000 | Sakakibara | 320/150 |
| 6,133,713 A | 10/2000 | Brotto | 320/150 |
| 6,154,007 A | 11/2000 | Shaver | 320/116 |
| 6,154,008 A | 11/2000 | Bradus | 320/125 |
| 6,160,389 A | 12/2000 | Watts | 320/107 |
| 6,172,487 B1 | 1/2001 | Brotto | 320/150 |
| 6,175,211 B1 | 1/2001 | Brotto | 320/106 |
| 6,191,560 B1 * | 2/2001 | Sakakibara | 320/150 |
| 6,229,280 B1 | 5/2001 | Sakoh | 320/106 |
| RE37,226 E | 6/2001 | Wheeler et al. | 429/98 |
| 6,275,009 B1 | 8/2001 | Sakakibara | 320/134 |
| 6,278,261 B1 | 8/2001 | Sakakibara | 320/150 |

* cited by examiner

Primary Examiner—Gregory Toatley
Assistant Examiner—Pia Tibbits
(74) Attorney, Agent, or Firm—Sughrue Mion, PLLC

(57) ABSTRACT

A battery charger and a charging method capable of charging a battery for a short period of time while suppressing battery temperature from rising. The current temperature of the battery is detected (in step S12) and a temperature rise is calculated from the detected temperature (in step S14). An allowable current map is then retrieved from the detected temperature and the obtained temperature rise, an allowable current with which the battery can be charged while suppressing battery temperature from rising is obtained (in step S16) and the battery is charged with the allowable current (in step S20). Since the allowable current which the battery can be charged with, while suppressing battery temperature from rising is retrieved using the map which the allowable current is mapped, based on battery temperature and battery temperature rise, and charging current is controlled, it is possible to charge the battery for a short period of time while suppressing battery temperature from rising.

35 Claims, 6 Drawing Sheets

Fig.5

| | | \|T\| | | | | |
|---|---|---|---|---|---|---|
| | | ~T₁ | T₁~T₂ | T₂~T₃ | T₃~T₄ | T₄~ |
| dT/dt | ~X₁ | I11 | I12 ⟨1⟩⟨3⟩ | I13 ⟨4⟩ | I14 ⟨9⟩ | I15 ⟨10⟩⟨12⟩ |
| | X₁~X₂ | I21 | I22 ⟨2⟩ | I23 ⟨5⟩⟨7⟩ | I24 ⟨8⟩ | I25 ⟨11⟩⟨13⟩ |
| | X₂~ | I31 | I32 | I33 ⟨6⟩ | I34 | I35 ⟨14⟩⟨15⟩ |

BATTERY CHARGER AND CHARGING METHOD

This application is a continuation of application Ser. No. 09/531,596, filed on Mar. 20, 2000, now U.S. Pat. No. 6,204,641, which is a continuation of application Ser. No. 09/258,140, filed on Feb. 26, 1999, now U.S. Pat. No. 5,075,347.

BACKGROUND OF THE INVENTION

1. Field of the Invention

The present invention relates to a battery charger and a charging method for charging a battery. The present invention relates, in particular, to a battery charger and a charging method suitable for charging a battery, such as a nickel metal hydride battery, which generates a large amount of heat during charging.

2. Description of the Related Art

Rechargeable battery have been recently used as a power source for a power tool, for example. A nickel metal hydride battery is widely used as the power tool battery of this type. To charge the battery, a battery charger for rapidly charging the battery with high current is used. That is, while one battery is being rapidly charged for about 20 minutes the, a power tool can be continuously used by replacing the currently used battery with another one which has been charged.

The inventor of the present invention studied ways to improve the performance of a power tool by using, as a battery, a nickel metal hydride battery. Although the nickel metal hydride battery can provide higher capacity than a nickel-cadmium battery, a large amount of heat is generated during charging. If the battery temperature becomes high due to the generated heat, the electrodes and separators of cells within the battery deteriorate and battery life is shortened. Due to this, the nickel metal hydride battery cannot be rapidly charged with high current using known charging techniques designed for a the nickel-cadmium battery.

Furthermore, the nickel metal hydride battery is more sensitive to overcharge than the nickel-cadmium battery and overcharging makes the battery life shorter. For that reason, it is required to avoid overcharging the nickel metal hydride battery. As for equipment which does not require battery replacement, to avoid overcharging the battery, charging current and discharging current are integrated and a battery is charged based on the integrated value. Thus, the battery can be fully charged. In case of charging a battery for equipment such as the above-stated power tool which requires replacing one battery with another, however, it has been difficult to fully charge the battery without overcharging it.

SUMMARY OF THE INVENTION

In one aspect of the present teachings, battery chargers and battery charging methods are taught that permit rapid and complete charging of the battery without overheating it. In one embodiment, a battery charger is taught that includes:

a memory for storing a map for mapping an allowable value of current, with which a battery can be charged while suppressing battery temperature from rising, based on a battery temperature and a battery temperature rise;

a temperature detection device for detecting a current temperature of the battery;

a temperature rise output device for obtaining the temperature rise from the temperature detected by the temperature detection device;

an allowable current retrieval device for retrieving the map of the memory device from the temperature detected by the temperature detection device and the temperature rise outputted from the temperature rise output device, and for obtaining the allowable value; and a charging device for charging the battery with the allowable current retrieved by the allowable current retrieval device.

In another embodiment, a battery charger is taught that includes:

a memory for storing a map for mapping an allowable value of current, with which a battery can be charged while suppressing battery temperature from rising, based on a battery temperature and a battery-temperature rise, the map having the allowable current value set low when the battery temperature is high and set low when the temperature rise is large;

a temperature detection device for detecting a current temperature of the battery;

a temperature rise output device for obtaining the temperature rise from the temperature detected by the temperature detection device;

an allowable current retrieval device for retrieving the map of the memory device from the temperature detected by the temperature detection device and the temperature rise outputted from the temperature rise output device, and for obtaining the allowable value;

a charging device for charging the battery with the allowable current retrieved by the allowable current retrieval device;

a charging completion determination device for determining that charging is completed based on whether or not the temperature detected by the temperature detection device and the temperature rise outputted from the temperature rise output device belong to a region indicating a final charging stage (a region in which temperature rise is relatively large and relatively low allowable current is outputted) on the map of the memory device with high frequency; and a charging completion device for completing charging based on the determination of the charging completion determination device that charging is completed.

In another embodiment, a charging method is taught that includes:

detecting current temperature of a battery;

obtaining a temperature rise from the detected temperature;

retrieving an allowable current map based on battery temperature and battery temperature rise, from the detected temperature and the obtained temperature rise, and obtaining an allowable value of current, with which the battery can be charged while suppressing the battery temperature from rising; and charging the battery with the retrieved allowable current.

In another embodiment, a charging method is taught that includes:

detecting a current temperature of a battery;

obtaining a temperature rise from the detected temperature;

retrieving an allowable current map based on battery temperature and battery temperature rise, from the detected temperature and the obtained temperature rise, and obtaining an allowable value of current with which the battery can be charged while suppressing the battery temperature from rising;

charging the battery with the retrieved allowable current;

determining that charging is completed based on whether the outputted temperature rise is relatively large and whether relatively low allowable current is outputted from the map with a high frequency; and completing charging based on the determination that charging is completed.

According to the battery charger and charging method described above, charging current is controlled using a map for mapping an allowable value of current with which a battery can be charged while suppressing battery temperature from rising based on battery temperature and battery temperature rise. That is, the map is retrieved from the battery temperature and temperature rise. The allowable value of current, with which the battery can be charged while suppressing the battery temperature from rising, is obtained. The battery is charged with the allowable current thus obtained. This makes it possible to charge a nickel metal hydride battery, the temperature of which tends to rise during charging, for a short period of time without causing deterioration due to temperature rise. Just before charging is completed, the temperature rise of the nickel metal hydride battery is larger and the battery is charged with relatively low current, therefore it is possible to suppress "overshoot" after the completion of charging.

In another aspect of the project teachings, the completion of charging is determined, in particular, based on whether or not a temperature rise is relatively large and whether or not relatively low current is outputted from the map with high frequency. That is, based on whether or not temperature rise is large and whether or not the rise is large even if charging current is decreased. Due to this, it is possible to fully charge the battery without fear of overcharging and without being influenced by the remaining battery capacity, temperature or other battery conditions.

BRIEF DESCRIPTION OF THE DRAWINGS

FIG. 5 is an explanatory view showing the content of a map held in the charging circuit;

DESCRIPTION OF THE PREFERRED EMBODIMENT

A battery charger and a charging method in one embodiment according to the present invention will be described with reference to the accompanying drawings.

Figure 1:
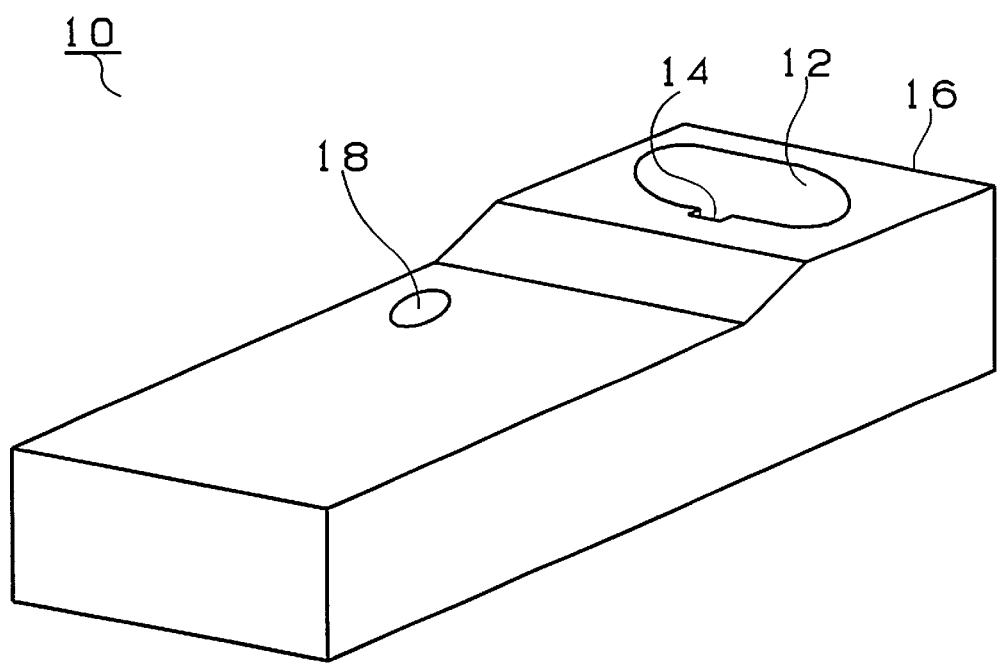
FIG. 1 is a perspective view of a battery charger in an embodiment according to the present invention.
Figure 2:
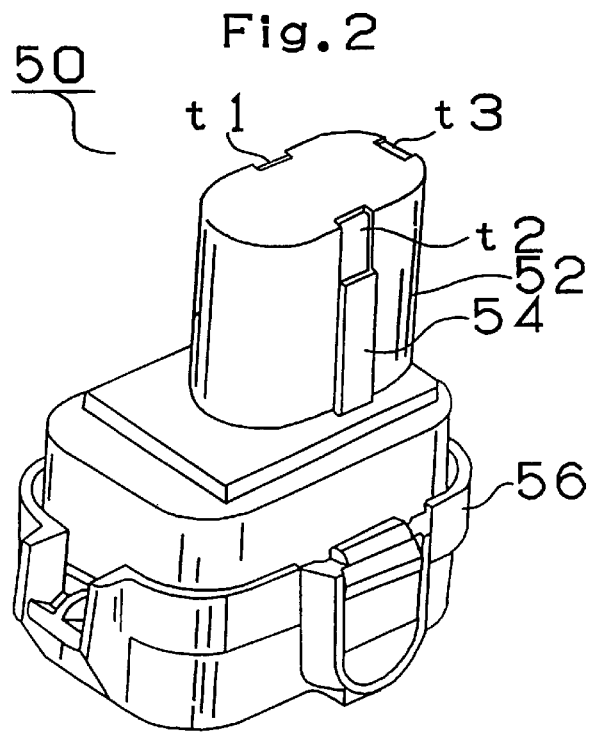
FIG. 2 is a perspective view of a battery pack in the embodiment according to the present invention.
Figure 3:
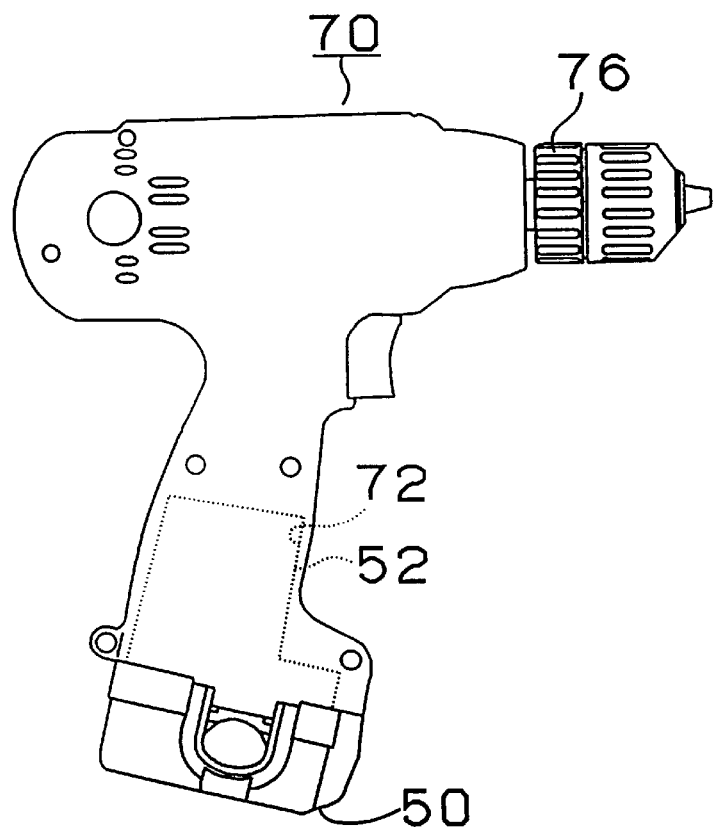
FIG. 3 is a perspective view of a battery drill using the battery powered pack shown in FIG. 2.

FIG. 1 shows a battery charger 10 in one embodiment according to the present invention. FIG. 2 shows a battery pack 50 charged by the battery powered charger. FIG. 3 shows a battery drill 70 driven by the battery pack 50.

As shown in FIG. 2, the battery pack 50, including a nickel metal hydride battery, consists of a generally cylindrical fitted section 52 and a generally prismatic base 56. A key-shaped key section 54 is formed on the side surface of the fitted section 52. The first input terminal t1 connected to the cathode of the battery, the second input terminal t2 connected to the anode therein and the third terminal t3 connected to a temperature sensor consisting of a thermistor are provided on the upper portions of the fitted section 52.

As shown in FIG. 1, a fitting hole 12 for fitting the fitted section 52 of the battery pack 50 is formed at the battery charter 10 for charging the battery pack 50. A key way 14 for introducing the key section 54 of the fitted section 52 is formed on the sidewall of the fitting hole 12. The fitting hole 12 is integral with a housing 16 which constitutes the battery charger 10 and is made from resin. In this embodiment, the key section 54 is provided at the fitted section 52 of the battery pack 50 and the fitted hole 12 of the battery charger 10 is provided with the key way 14. This thereby prevents the battery pack 50 from being inserted in an incorrect manner. First to third output terminals (not shown) are provided at the bottom of the fitting hole 12 to make contact with the first to third terminals t1, t2 and t3 of the battery pack 50. An LED lamp 18 is provided on the top of the battery charger 10 to indicate that the battery is being charged.

As shown in FIG. 3, a fitting hole 72 for fitting the fitted section 52 of the battery pack 59 is provided in the battery powered drill 70. When electric power is supplied from the first and second input terminals t1 and t2 of the battery pack 50 to the battery powered drill 70, a motor (not shown) is driven to rotate a chuck 76. If the battery powered drill 70 is in use, a plurality of batteries which have been charged within the battery pack 50 are sequentially used to allow continuous operation. To this end, the battery charger 10 in this embodiment is designed to be capable of rapidly charging the battery pack 50 in approximately 20 minutes.

Figure 4:
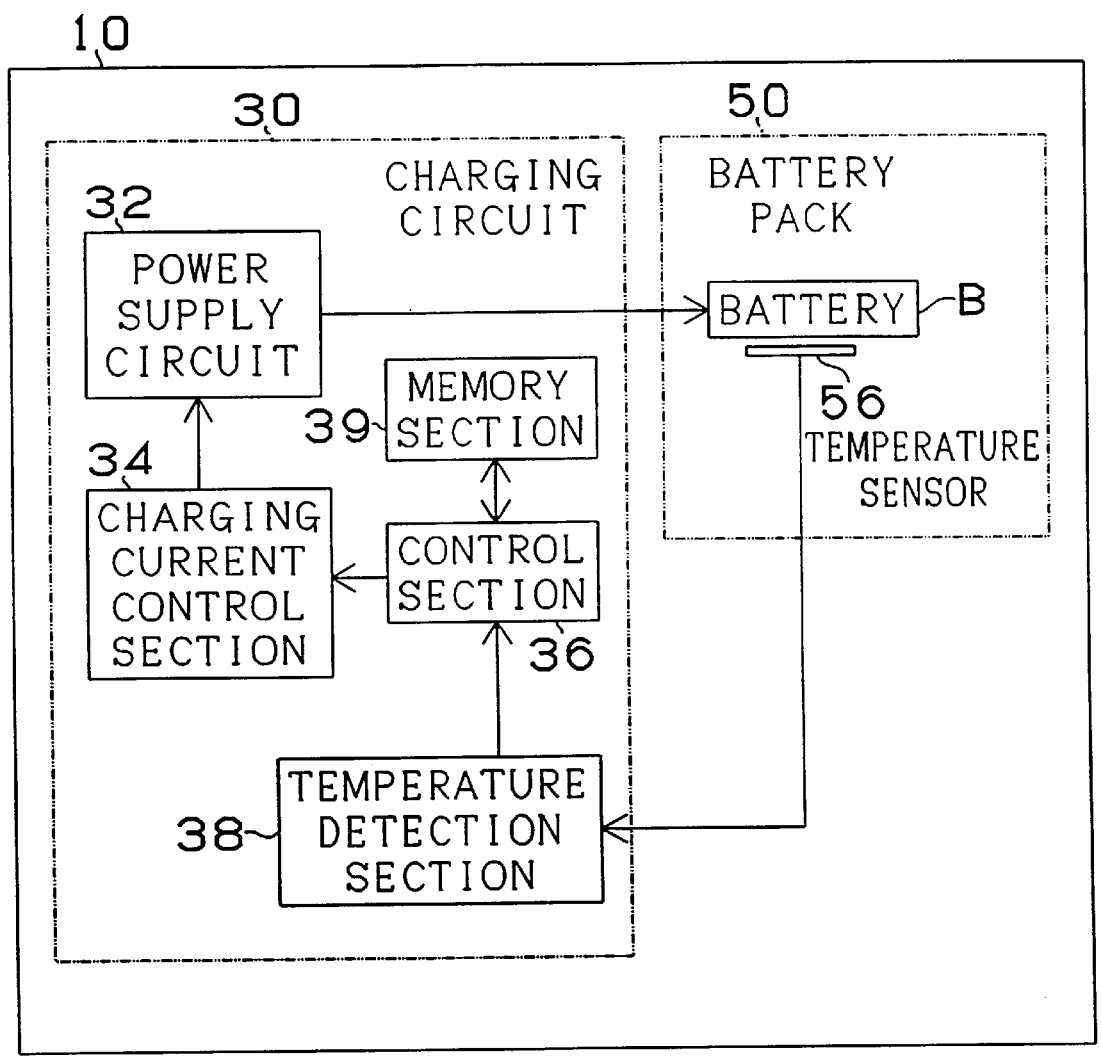
FIG. 4 is a block diagram showing a charging circuit in the battery charger shown in FIG. 1.

FIG. 4 shows the configuration of a control circuit within the battery charger 10. The control circuit 30 consists of a temperature detection section 38 for detecting the temperature of a battery from an output value of a temperature sensor (or thermistor) 56 provided with the battery pack 50', a memory section 39 for storing a current controlling map, a control section 34 for obtaining a temperature rise by differentiating a temperature value outputted from the temperature detection section 38, selecting an allowable current value suppressing the rise of temperature from retrieving based on the up battery temperature and the rate of battery temperature increase rise, and outputting the allowable current value as a current command value to the charging control section 34, and the charging current control section 34 for controlling a power supply circuit 32 based on the current command value derived from the control section 36 and from adjusting the battery charging current.

Description of the constitution of the map used for current control will be given with reference to FIG. 5.

If the battery is charged with high current, charging time is shortened but the battery temperature increases rapidly. Conversely, if the battery is charged with lower current, charging time is lengthened but temperature rise is smaller. The nickel metal hydride battery, in particular, possesses characteristics that a temperature gradient (or temperature rise) greatly varies in accordance with charging current or the presently charged capacity. Considering the characteristics, in this embodiment, the battery is charged by frequently adjusting the charging current to rapidly charge the battery without overheating the battery. Specifically, in the battery charger according to the conventional technique, the battery is charged with current of a constant value. In the battery charger of this embodiment, by contrast, the state of the battery is determined based on the absolute temperature and temperature rise, the battery is charged with as high current as possible which can be applied in order to avoid overloading the battery, i.e., the battery is charged with varying current in accordance with the state of the battery.

In this embodiment, if the battery temperature is high, relatively low charging current is applied. If the temperature is low, relatively high charging current is applied. If temperature rise is large, relatively low charging current is applied. If the temperature rise is small, relatively high charging current is applied.

The map is provided for variable-control of current and for specifying an optimum value of current which can be applied in order to avoid overheating battery. In the map, the horizontal axis indicates the absolute temperature T of a battery and the vertical axis indicates a temperature difference dT/dt. That is, if the temperature of the battery is high and temperature rise is large (lower right side on the map), then a relatively low charging current is applied. If the temperature of the battery is high and the temperature rise is small (upper end side on the map), a medium level charging current is applied. If the battery temperature is low and the temperature rise is large (lower left side on the map), a medium level charging current is applied. If the battery temperature is low and the temperature rise is low (upper left on the map), a relatively high charging current is applied. Namely, such optimum current values are showed in the map in order to meet both expected charging time (approximately 20 minutes) and expected final temperature.

If high current is discharged at low temperature (0° C. or less), battery performance deteriorates. It is, therefore, desirable to set a low current value on the left column on the map in order to avoid performance deterioration. The charging current supplied to the battery is selected upon the present battery temperature T and the present battery temperatured increase rate dT/dt battery temperature is between T3 and T4 and the battery temperature increase rate dT/dt is between X1 and X2, then current in the region I24 is outputted.

Thereafter, the battery charger in this embodiment detects that charging is completed based on the movement of current within the regions on the map. That is, according to the conventional technique, completion of charging is detected by keeping charging current constant and observing temperature or voltage. More specifically, the conventional device detects a temperature rise and a voltage variation as well as that the battery is fully charged and voltage decreases. It also determines that the battery is fully charged. In the battery charger in this embodiment, since charging current is changed as stated above, it is impossible to detect that the battery charging is completed from only monitoring temperature and a temperature variation, or voltage and a voltage variation. In this embodiment, therefore, the battery charger detects charging is completed based on the movement of current in ranges on the map.

While the battery is being charged, a current value will appear to move within the regions at random based on the temperature and temperature rise. In other words, before the battery is fully charged, the battery temperature rises or a temperature rise is large. If a relatively small charging current region is selected, that is, after a region on the lower right side on the map is selected, then current decreases and temperature rise is smaller. The current region thus corresponds to an upper side region on the map.

As the battery approaches a fully charged state, the battery temperature will increase more quickly based upon a given charging current due to this characteristic of nickel metal hydride batteries. As the battery temperature increase rate increases, a lower region is selected on the map and thus, a lower charging current is supplied to the battery. However, when the battery is close to being fully charged, the battery temperature increase rate will remain high, even though a relatively low current is supplied to the battery. In consideration of this characteristic, the battery charger will repeatedly measure the battery temperature (e.g. three times) at predetermined intervals (e.g. intervals of several thousands seconds). If the current being supplied to the battery falls within the cross-hatched regions of the map of FIG. 5, i.e., 125 or 131–135, over several intervals, the battery charger determines that the battery is fully charged and charging is stopped.

Charging operation of the charging circuit 30 will be described in more detail with reference to a graph shown in FIG. 6.

Figure 6:
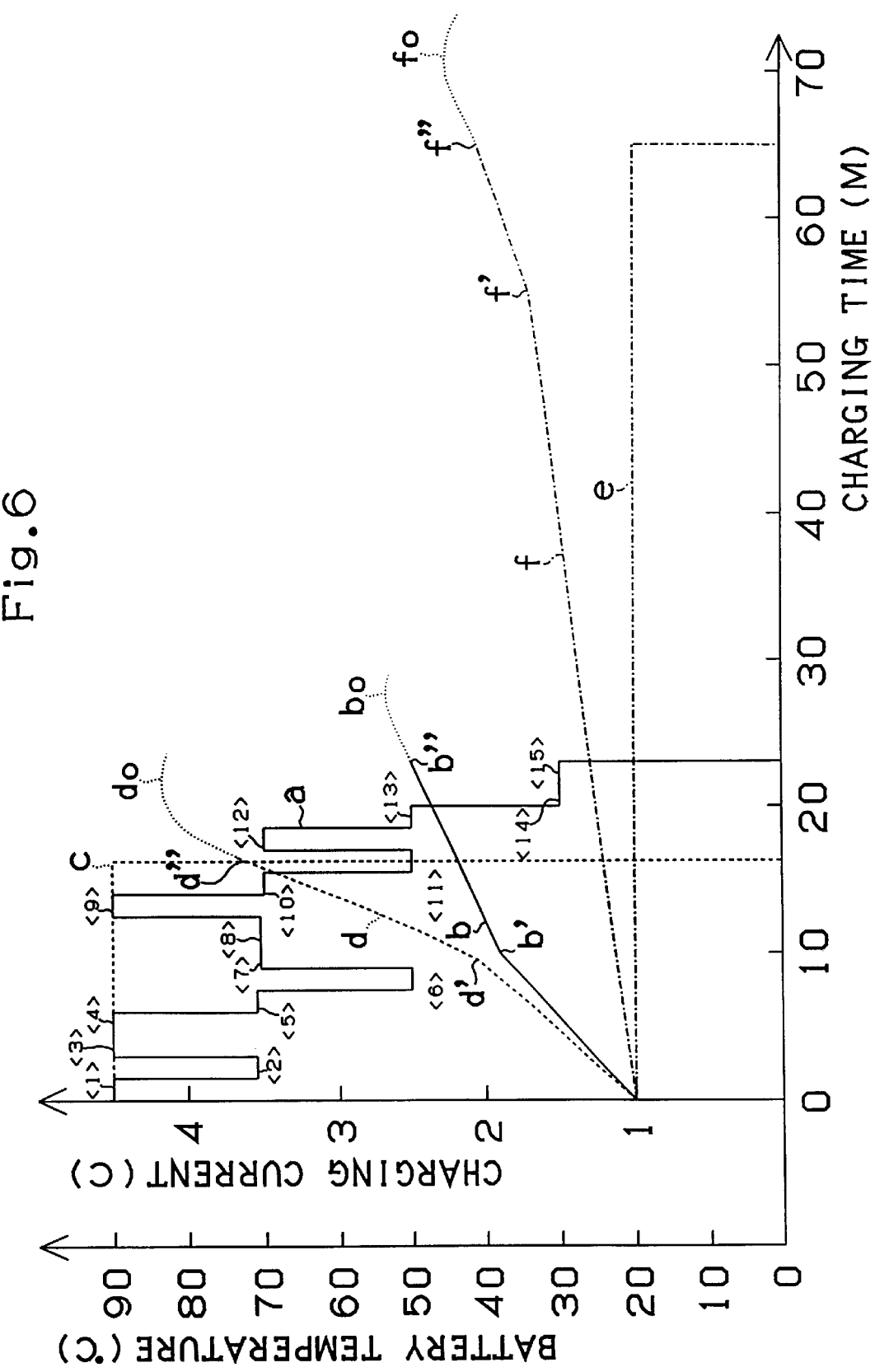
FIG. 6 is a graph showing the change of charging current and that of battery temperature both controlled by the charging circuit.

In FIG. 6, the horizontal axis indicates charging time, whereas the vertical axis indicates charging current and battery temperature. FIG. 6 also shows, as comparison, temperature rise in a case where a nickel metal hydride battery has been charged for one hour and temperature rise in a case where the battery is rapidly charged as well as the case of the battery charger in this embodiment.

Conventionally, to avoid generating heat while a nickel metal hydride is being charged, 1C charging is conducted as shown in dash line e of FIG. 6. That is, a 2AH nickel metal hydride battery is charged with 2A charging current for about one hour (65 minutes in FIG. 6). In case of 1C charging, charging starts at a temperature of 20° C. as shown in dotted line f of FIG. 6 and ends at a temperature of 40° C. Due to the characteristics of the nickel metal hydride battery, a sharper rise is seen just before the completion of charging (55 minutes after the start of charging) shown in f' of FIG. 6 and further temperature rise is seen from a time f" at which charging is completed (overshoot f0). It is considered that the overshoot of the nickel metal hydride battery depends on the gradient of temperature rise at the time charging is completed. If a gradient at f'–f" is small, overshoot-induced temperature rise is small. If the gradient is large, that is, temperature sharply increases at the end of charging, then overshoot-induced temperature rise is large.

Meanwhile, chain line c indicates current if a battery is rapidly charged (4.5C charging) with constant high current (9A) by a conventional battery charger so as to complete charging in approximately 20 minutes. Chain line d indicates the temperature change of the nickel metal hydride in rapid charging. As indicated by the chain line d, even if charging starts at a temperature of 20° C., the temperature reaches 70° C. at which the nickel metal hydride battery life is shortened when charging is completed. Moreover, temperature rapidly rises just before the completion of charging (11 minutes after start) indicated by d' in FIG. 6 until d" at which charging is completed. Due to this, temperature greatly rises at time d" at which charging is completed (overshoot d0). The overshoot d0 causes temperature to rise further as high as 80° C. even after charging is completed, as a result the life of the nickel metal hydride battery is shortened. According to the graph of FIG. 6, since charging starts at 20° C. and is completed at 80° C., a temperature rise is 60° C. during that period. If, therefore, charging of the nickel metal hydride battery starts at 30° C., and temperature rises by 60° C. to 90° C. or higher, the battery performance greatly deteriorates at this point.

Solid line <a> indicates a change in charging current in the battery charger in the first embodiment according to the present invention, whereas solid line <b> indicates a change in the temperature of nickel metal hydride battery if the battery is charged by the battery charger in this embodiment. The battery charger 10 in this embodiment applies relatively low charging current if battery temperature is high and temperature rise is large. The device 10 applies medium level charging current if battery temperature is high and temperature rise is small. The device 10 applies medium level charging current if battery temperature is low and temperature rise is large. The device 10 applies relatively high charging current if battery temperature is low and temperature rise is small. In this way, the battery charger 10 in this embodiment adjusts current based on the temperature of the nickel metal hydride battery and its temperature rise. The device 10 starts charging the battery at a temperature of 20° C. as shown in the full line <b> while controlling the temperature to fall within 50° C. or less so as not to affect the battery life. In other words, the device 10 adjusts charging current to maximum current while avoiding exceeding the expected temperature and shortening charging time.

As stated above, the battery charger 10 frequently changes charging current in accordance with the battery temperature and temperature rise. That is, high current is applied at an initial charging stage, i.e., while battery temperature is low and temperature rise is small. Relatively low charging current is applied at a final charging stage, i.e., if battery temperature is high and temperature rise is large so that temperature rise is kept small just before the completion of charging. Specifically, temperature rise is small (or temperature rise gradient is small) from a time b' (11 minutes after the start of charging) just before the completion of charging until a time b" at which charging is completed. As a result, temperature rise (overshoot b0) after the completion of charging is small and heat generation during and after charging is suppressed such that temperature rise during and after charging is almost the same (approximately 50° C.) as that in 1C charging indicated by the dotted line f.

Even in 1C charging as indicated by the dotted line f, if battery temperature at the start of charging is high, for example, if charging is started at a battery temperature of 30° C., then temperature rises by 30° C. and reaches 60° C. at the completion of charging. In this embodiment, by contrast, current is controlled in accordance with temperature and battery temperature can be limited to up to 50° C. when charging is completed. In the case of the power tool battery, in particular, where the motor is continuously driven with high current and capacity is exhausted, the battery charging is likely to begin when the battery temperature is already relatively high. In the battery charger in this embodiment, even if a nickel metal hydride battery is at such a high temperature it can charge to the extent that the temperature does not exceed an expected charging temperature. It is, thus, possible to repeatedly use the nickel metal hydride battery for a long period of time.

Figure 7:
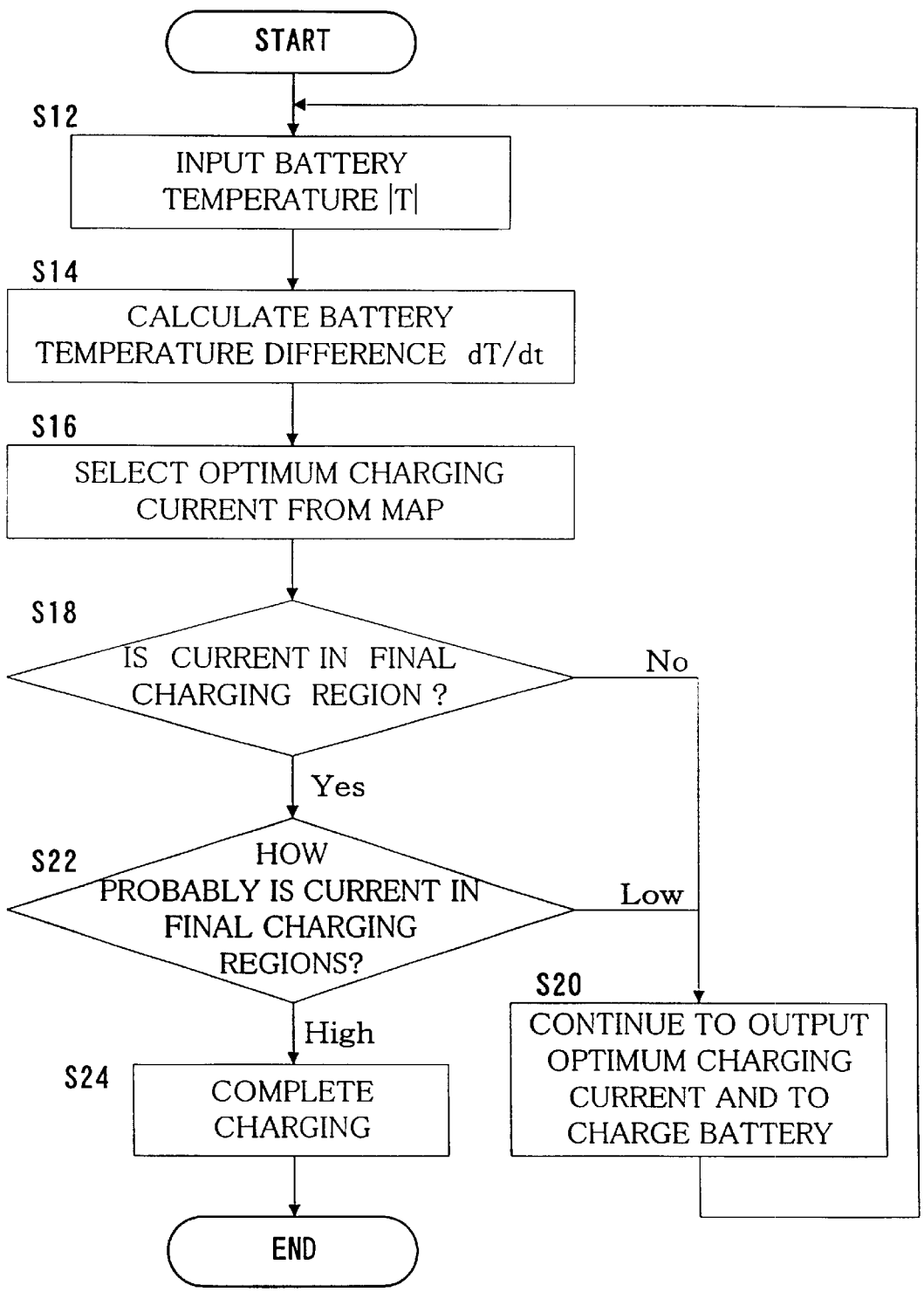
FIG. 7 is a flow chart showing the charging circuit process.

Specific processing of the battery charger in this embodiment will be described with reference to FIGS. 5 and 6 as well as the flow chart shown in FIG. 7.

First, after charging starts, a control section 36 of the battery charger (see FIG. 4) adjusts charging current and determines whether battery charging is completed predetermined cycle within a predetermined cycle (for example, although 100 second intervals are described for the purpose of illustration, in fact shorter intervals of 10 seconds or less are used in practice). Specifically, first, the absolute temperature T of the nickel metal hydride battery is inputted (in step S12). Next, the inputted absolute temperature T is differentiated and a battery temperature difference dT/dt is calculated (in step S14). Based on the absolute temperature T and the temperature difference dT/dt, an optimum charging current is selected from the map which has been already described with reference to FIG. 5 (in step S16). In this case, as indicated in cycle <1>, where the absolute temperature T is between T1 and T2 and the temperature difference dT/dt is X1 or less, region I12 is selected and relatively high current of 4.5C, charging current (9A) is applied as indicated by the solid line a shown in FIG. 7.

Thereafter, the control section 36 determines whether 20 current is in final charging regions, i.e., hatched regions I31, I32, I33, I34 and I35 in which temperature rise is large and in a region I25 in which temperature rise is medium level (in step S18). In this case, since the current is not in the final charging region ("NO" in the Step S18), process returns to the step S12 and control of the charging current continues. In cycle <2> after more than 100 seconds pass, because a relatively high current has been applied in cycle <1> as stated above, the temperature difference dT/dt is larger (X1 to X2) and region I22 is selected, so that medium level current (3.5C) is selected. Since the medium level current is selected in the cycle <2>, the temperature difference dT/dt turns into X1 or less. In cycle <3>, the region I12 is selected and relatively high charging current is thereby selected once again.

As stated above, if charging is continued while current value is changed in accordance with the absolute temperature T and the temperature difference dT/dt, the difference dT/dt gradually increases. In cycle <6>, as shown in FIG. 5, the temperature difference dT/dt exceeds X2 and enters region 133. In this case, the determination result is Yes in step 18. That is, current is determined in the final charging regions (regions I31, I32, I33, I34, I35 and I25) as stated above, and it is then determined whether the battery is likely to be in a final charging states (in step S22). It is determined that the battery is likely in a final charging state if a current has been selected from one of the final charging regions in three consecutive cycles. While the current is decreased in the cycle <6>, the absolute temperature T is between T2 and T3 and the temperature difference dT/dt is decreased to X1 to X2 in the next cycle <7>, whereby current is in the region I23. Thus, the determination result as to whether it is highly probable that the battery is in the final charging state is Low in step S22 and the process goes on to step 20 in which charging continues with a variable charging current.

Meanwhile, if current enters region I25 which belongs to final charging regions in cycle <13>, current enters the region I35 which also belongs to the final charging regions in the next cycles <14>and <15>. If current enters final charging regions in three consecutive cycles, the determination result as to whether it is high probable that the battery has entered the final charging state is High and charging is completed (in step S24), thereby ending all series of processing.

In the above-stated example, description has been given to a case where cycle time is 100 seconds for convenience of description. Due to this, it is determined that it is highly probable that the battery is in a final charging state if a current is selected from one of the final charging regions in three consecutive cycles. If cycle time is made shorter than a 100 seconds' cycle, it is possible to determine that it is highly probable that current enters final charging regions using various methods. For instance, in a 10 seconds' cycle, it is highly probable that the battery has entered the final charging state in eight out of 10 cycles. Alternatively, it can be determined that the probability is high if the battery is in a final charging state if a current is selected from one of the final charging regions in eight out of 10 cycles and if a current is selected from one of the final charging regions in five consecutive cycles.

As described above, the conventional battery charger for charging a nickel-cadmium battery detects that charging is completed by keeping a current value constant and monitoring one or more of temperature, temperature change, voltage and voltage change. In the case of a nickel metal hydride battery, however, patterns of temperature and voltage change vary in accordance with the battery remaining capacity, battery temperature at the start of battery charging and outside temperature. Due to this, it has been difficult to fully charge the nickel metal hydride battery without fear of overcharge. The battery charger in this embodiment, by contrast, continuously monitors the absolute temperature T and temperature difference dT/dt while adjusting charging current. It is, therefore, possible to fully charge the battery without fear of overcharge.

The embodiment has been described so far, taking processing for charging a nickel metal hydride battery for an example. The battery charger and charging method according to the present invention can be also applied to processing for charging a nickel-cadmium battery. As specified, if the map shown in FIG. 5 is adjusted to the characteristics of the nickel-cadmium battery, the present invention is applicable to the process for charging a nickel-cadmium battery. In addition, if the map is adjusted to the common characteristics (greatest common divisor) of a nickel-cadmium battery and a nickel metal hydride battery, both the nickel-cadmium battery and the nickel metal hydride battery can be charged.

Furthermore, the battery pack 50 may be provided with a discriminating terminal (such as a boss) for discriminating a nickel metal hydride battery from a nickel-cadmium battery and a map may be prepared for each of the nickel metal hydride battery and the nickel-cadmium battery at the battery charger side. If the battery pack 50 of the nickel metal hydride battery is installed, charging can be controlled according to the map for the nickel metal hydride battery. If the battery pack 50 of the nickel-cadmium is installed, charging can be controlled according to the map for the nickel-cadmium battery.

As stated so far, according to the present invention, the map is retrieved and the battery is charged with allowable current with which the battery can be charged while suppressing battery. temperature from rising. This makes it possible to charge a nickel metal hydride battery, the temperature of which tends to rise during charging, for a short period of time without causing a deterioration in the battery due to temperature rise. In addition, just before the completion of charging, the temperature rise of the nickel metal hydride battery is larger and the battery is charged with a relatively low current, so that it is possible to suppress "overshoot" after the completion of charging.

The completion of charging is determined, in particular, based on whether or not temperature rise is large and whether or not temperature rise is large even if the charging current is lowered. Due to this, it is possible to fully charge the battery without fear of overcharge and without being influenced by the remaining battery capacity, temperature and the like.

What is claimed is:

1. A method for charging a battery comprising:
    supplying a charging current to the battery while monitoring battery temperature and battery temperature increase rate,
    changing the charging current based upon the battery temperature and the battery temperature increase rate in order to avoid overheating the battery; and
    terminating the supply of charging current to the battery based upon a determination that a relatively low charging current has been repeatedly supplied to the rechargeable battery over a series of intervals.

2. The method as in claim 1, wherein the current is terminated when a relatively low current is supplied to the rechargeable battery in 8 out of 10 intervals and in 5 consecutive intervals.

3. A method of charging a battery comprising:
    monitoring battery temperature and battery temperature increase rate of the battery,
    selecting a charging current from a look up table using the battery temperature and battery temperature increase rate as indices for the look up table,
    supplying the selected charging current to the battery while continuing to monitor the battery temperature and battery temperature increase rate at frequent intervals,
    selecting a new charging current from the look up table when the battery temperature and/or the battery temperature increase rate changes; and
    terminating the charging when the battery temperature increase rate is relatively high and a relatively low charging current has been supplied to the battery at relatively high frequency.

4. The method as in claim 3, wherein a lower charging current is selected if the battery temperature and/or battery temperature increase rate increases.

5. The method as in claim 4, wherein a higher charging current is selected if the battery temperature increase rate decreases.

6. The method as in claim 5, wherein the supply of charging current to the battery is terminated based upon a determination that a relatively low charging current has been repeatedly supplied to the rechargeable battery over a plurality of consecutive intervals.

7. The method as in claim 6, wherein the current is terminated when a relatively low current is supplied to the rechargeable battery in 8 out of 10 intervals and in 5 consecutive intervals.

8. An apparatus adapted to charge a removable battery pack having a battery temperature sensor and a charging terminal comprising:
    a controller adapted to couple to the battery temperature sensor and charging terminal of the removable battery pack, wherein the controller terminates a supply of charging current to the battery when the battery temperature increase rate is relatively high and a relatively low charging current has been supplied to the battery at a relatively high frequency.

9. The apparatus as in claim 8, wherein the controller comprises instructions for stopping the supply of current to the battery if the current being supplied to the battery falls below a predetermined current value over a series of consecutive intervals.

10. The apparatus as in claim 8, further comprising a look up table comprising a set of allowable charging current values and having battery temperature and battery temperature increase rates as indices, wherein the controller further comprises instructions for selecting an allowable charging current value based upon a present battery temperature and present battery temperature increase rate.

11. An apparatus adapted to supply current to a rechargeable battery comprising:

a first terminal adapted to couple to a battery temperature sensor, a power supply, a second terminal coupled to the power supply and adapted to supply current to the battery and a controller coupled to the first terminal and the power supply, wherein the controller is adapted to terminate the supply of current to the battery based upon a determination that a relatively low charging current has been repeatedly supplied to the rechargeable battery over a series of intervals.

12. The apparatus as in claim 11, further comprising a look up table comprising a set of allowable charging current values and having battery temperature and battery temperature increase rates as indices, wherein the controller further comprises instructions for selecting an allowable charging current value based upon a present battery temperature and present temperature increase rate.

13. The apparatus as in claim 12, wherein the controller comprises instructions for stopping the supply of current to the battery if the current being supplied to the battery falls below a predetermined current value over a plurality of consecutive intervals.

14. A battery charging system, comprising:

means for detecting a battery temperature and battery temperature increase rate, means for storing a map of allowable current values based upon the detected battery temperature and a battery temperature increase rate, means for supplying a selected allowable charging current to the battery selected from the storing means, wherein the allowable charging current is selected based upon the detected battery temperature and battery temperature increase rate; and means for terminating the supply of charging current to the battery based upon a determination that a relatively low charging current has been repeatedly supplied to the battery over a series of intervals.

15. A method for charging a battery, comprising:

using a processor to select an allowable current value from a look up table based upon a detected battery temperature and detected battery temperature increase rate;

supplying the selected allowable current to the battery while continuing to detect the battery temperature and the battery temperature increase rate, selecting a new allowable current value when the battery temperature and/or battery temperature increase rate changes; and terminating the supply of current to the battery when the battery temperature is relatively high and a relatively low charging current has been supplied to the battery over a plurality of consecutive intervals.

16. A controller adapted to provide instructions for charging a battery, comprising:

instructions to terminate battery charging when a relatively high battery temperature is detected and a relatively low charging current has been supplied to the battery over a plurality of consecutive intervals.

17. The controller as in claim 16, further comprising:

a look up table comprising a set of allowable current values and having detected battery temperature and detected battery temperature increase rate as indices; and instructions for selecting an allowable current value from the look up table based upon the detected battery temperature and detected battery temperature increase rate.

18. A method for charging a rechargeable battery comprising:

supplying a charging current to the rechargeable battery, and terminating a supply of charging current to the rechargeable battery based upon detection over a series of intervals that relatively low charging current has been supplied to the rechargeable battery.

19. A method as in claim 18, wherein the charging current is terminated when a relatively low charging current is supplied to the rechargeable battery in 8 out of 10 intervals and in 5 consecutive intervals.

20. A method as in claim 18, wherein the rechargeable battery comprises nickel metal hydride battery cells and further comprising adjusting the supply of charging current in order to prevent the temperature of the nickel metal hydride battery cells from exceeding 50° C.

21. A method as in claim 18, further comprising:

supplying the charging current to the rechargeable battery while monitoring battery temperature and battery temperature increase rate and adjusting the charging current to a current selected from the group consisting of:

(i) a relatively high current, if the battery temperature and battery temperature increase rate are relatively low, (ii) an intermediate current, if the battery temperature is relatively low and the battery temperature increase rate is relatively high, or if the battery temperature is relatively high and the battery temperature increase rate is relatively low, and (iii) a relatively low current, if the battery temperature and battery temperature increase rate are relatively high.

22. A method as in claim 21, wherein the rechargeable battery comprises nickel metal hydride battery cells and the supply of charging current is adjusted so as to prevent the temperature of the nickel metal hydride battery cells from exceeding 50° C.

23. A method as in claim 22, wherein the charging current is terminated when a relatively low charging current is supplied to the rechargeable battery in 8 out of 10 intervals and in 5 consecutive intervals.

24. A battery charger comprising:

a processor programmed to terminate a supply of charging current to a rechargeable battery based upon repeated detection over a series of intervals that relatively low charging current has been supplied to the rechargeable battery, and means for establishing electrical communication between the processor and the rechargeable battery.

25. A battery charger as in claim 24, wherein the processor is programmed to terminate the charging current when a relatively low charging current is supplied to the rechargeable battery in 8 out of 10 intervals and in 5 consecutive intervals.

26. A battery charger as in claim 24, wherein the rechargeable battery comprises nickel metal hydride battery cells and the processor is further programmed to adjust the supply of charging current in order to prevent the temperature of the nickel metal hydride battery cells from exceeding 50° C.

27. A battery charger as in claim 24, wherein the processor is further programmed to:

supply the charging current to the rechargeable battery while monitoring battery temperature and battery temperature increase rate and adjust the charging current to a current selected from the group consisting of:
- (i) a relatively high current, if the battery temperature and battery temperature increase rate are relatively low,
- (ii) an intermediate current, if the battery temperature is relatively low and the battery temperature increase rate is relatively high, or if the battery temperature is relatively high and the battery temperature increase rate is relatively low, and
- (iii) a relatively low current, if the battery temperature and battery temperature increase rate are relatively high.

28. A method as in claim 27, wherein the rechargeable battery comprises nickel metal hydride battery cells and the processor is further programmed to adjust the supply of charging current so as to prevent the temperature of the nickel metal hydride battery cells from exceeding 50° C.

29. A method as in claim 28, wherein the processor is further programmed to terminate the charging current when a relatively low charging current is supplied to the rechargeable battery in 8 out of 10 intervals and in 5 consecutive intervals.

30. A method of charging a battery comprising:
monitoring battery temperature and battery temperature increase rate of the battery,
adjusting charging current supplied to the battery to a current selected from the group consisting of:
- (i) a relatively high current, if the battery temperature and battery temperature increase rate are relatively low,
- (ii) an intermediate current, if the battery temperature is relatively low and the battery temperature increase rate is relatively high, or if the battery temperature is relatively high and the battery temperature increase rate is relatively low, and
- (iii) a relatively low current, if the battery temperature and battery temperature increase rate are relatively high, and terminating the charging current when the battery temperature increase rate is relatively high and relatively low charging current has been supplied to the battery at a relatively high repetition rate.

31. A method as in claim 30, wherein the battery comprises nickel metal hydride battery cells and the supply of charging current is adjusted so as to prevent the temperature of the nickel metal hydride battery cells from exceeding 50° C.

32. A method as in claim 30, wherein the charging current is terminated when a relatively low charging current is supplied to the battery in 8 out of 10 intervals and in 5 consecutive intervals.

33. An apparatus comprising:
means for monitoring battery temperature and battery temperature increase rate of a rechargeable battery,
means for adjusting charging current supplied to the battery to a current selected from the group consisting of:
- (i) a relatively high current, if the battery temperature and battery temperature increase rate are relatively low,
- (ii) an intermediate current, if the battery temperature is relatively low and the battery temperature increase rate is relatively high, or if the battery temperature is relatively high and the battery temperature increase rate is relatively low, and
- (iii) a relatively low current, if the battery temperature and battery temperature increase rate are relatively high, and means for terminating the charging current when the battery temperature increase rate is relatively high and relatively low charging current has been supplied to the rechargeable battery at a relatively high repetition rate.

34. An apparatus as in claim 33, wherein the rechargeable battery comprises nickel metal hydride battery cells and the charging current adjusting means prevents the temperature of the nickel metal hydride battery cells from exceeding 50° C.

35. An apparatus as in claim 33, wherein the charging current terminating means terminates the supply of charging current when relatively low charging current is supplied to the rechargeable battery in 8 out of 10 intervals and in 5 consecutive intervals.

* * * * *